United States Patent [19]

Timar et al.

[11] Patent Number: 4,665,963
[45] Date of Patent: May 19, 1987

[54] PNEUMATIC TIRE INNER LINER HAVING PUNCTURE SEALING CHARACTERISTICS

[75] Inventors: John Timar; Sheikh A. H. Mohammed; John Walker, all of Sarnia, Canada

[73] Assignee: Polysar Limited, Sarnia, Canada

[21] Appl. No.: 662,835

[22] Filed: Oct. 19, 1984

Related U.S. Application Data

[63] Continuation-in-part of Ser. No. 499,893, Jun. 1, 1983, abandoned.

[51] Int. Cl.⁴ ............................................. B60C 21/14
[52] U.S. Cl. .................................. 152/504; 428/912; 523/166
[58] Field of Search ............ 152/330 R, 330 RF, 347, 152/346, DIG. 16; 156/115; 428/912; 106/33; 523/166

[56] References Cited

U.S. PATENT DOCUMENTS

| | | | |
|---|---|---|---|
| 2,657,729 | 11/1953 | Hardman et al. | 152/347 |
| 2,765,018 | 10/1956 | Connell | 156/115 |
| 2,827,098 | 3/1958 | Semegen et al. | 152/347 |
| 3,565,151 | 2/1971 | Courtney | 152/347 |
| 4,089,360 | 5/1978 | Bohm | 152/347 |
| 4,140,167 | 2/1979 | Bohm | 152/347 |
| 4,171,237 | 10/1979 | Bohm | 152/347 |
| 4,228,839 | 10/1980 | Bohm | 152/347 |
| 4,424,295 | 1/1984 | Van Ornum et al. | 524/526 |
| 4,426,468 | 1/1984 | Ornum et al. | 152/347 |

FOREIGN PATENT DOCUMENTS

| | | | |
|---|---|---|---|
| 0075703 | 6/1977 | Japan | 152/347 |
| 0124803 | 10/1978 | Japan | 156/115 |

Primary Examiner—Donald E. Czaja
Assistant Examiner—Ramon R. Hoch
Attorney, Agent, or Firm—Stevens, Davis, Miller & Mosher

[57] ABSTRACT

There is provided a tubeless pneumatic tire with an inner liner having puncture sealing characteristics comprising as the inner liner a puncture sealing laminate having an outer halobutyl polymer containing layer and an inner polymer containing layer, the inner layer of the laminate having been reacted with a zinc peroxide compound.

8 Claims, 4 Drawing Figures

PNEUMATIC TIRE INNER LINER HAVING PUNCTURE SEALING CHARACTERISTICS

This is a continuation-in-part of application Ser. No. 499,893, filed June 1, 1983, now abandoned.

BACKGROUND OF THE INVENTION

This invention is directed to a tubeless pneumatic tire with an inner liner having puncture sealing characteristics, the inner liner comprising a laminate an outer layer of which is based on halobutyl and the inner layer of which is based on butyl.

DESCRIPTION OF THE PRIOR ART

One objective of both the automotive industry and the tire industry has been to develop a self-sealing tire, by which is meant a tire having puncture sealing properties. One approach to providing such a tire has been to provide a layer or coating of a material which will flow into and seal a hole resulting from a puncture and generally such a layer or coating is applied to the inside of the tire after it has been cured. U.S. Pat. No. 3,981,342 teaches a puncture sealing tire having within the tire a puncture sealing layer comprising a low molecular weight elastomer the mixture being partially crosslinked. German published patent application 2,840,035 teaches the use as the sealing layer of cured alkyl acrylate-glycidyl monomer polymers. U.S. Pat. No. 4,090,546 describes the sealing layer as being a mixture of a non-polar polymer, polybutene and white carbon. Japanese published patent application 80 15396 teaches coating the interior of the tire with a vulcanizable elastomer composition. U.S. Pat. No. 4,216,812 describes a puncture sealant containing a lubricant and an amide wax applied as a layer to the interior of a tire. U.S. Pat. No. 4,304,281 teaches a run-flat tire having a coating on its interior surface of a lubricating material. The use of a laminated puncture sealing strip in pneumatic tires is described in U.S. Pat. No. 3,048,509, the laminated strip having layers of an unvulcanized styrene-butadiene polymer and softening and tackifying agents interposed between layers of vulcanized styrene-butadiene polymer. U.S. Pat. No. 4,089,360 teaches a pneumatic tire having a laminate as an inner liner wherein the laminate has at least two groups of layers, each layer containing polymer and vulcanizing agent, one such group of layers containing paradichlorobenzene or thioetherpolythiol and the other such group of layers containing a specified amine or phenol compound, the laminate being exposed to radiation and assembled in the tire. U.S. Pat. No. 4,171,237 teaches a method of manufacturing a pneumetic tire having a laminated inner liner which comprises at least two layers by providing a first layer with a polymer that crosslinks at vulcanization temperature and a sealant layer containing a polymer and a peroxide which at least partially degrades at vulcanization temperature, assembling the layers and heating. U.S. Pat. No. 4,228,839 discloses a method for making a pneumatic tire which contains a puncture sealant layer within the crown area of the tire by assembling the puncture sealant layer in the tire, vulcanizing the tire and subsequently irradiating the tire, the puncture sealant layer being a mixture containing one polymeric material that degrades on irradiation and a second polymeric material that crosslinks on irradiation.

SUMMARY OF THE INVENTION

The present invention describes a tubeless pneumatic tire having puncture sealing characteristics and a process of making same, the tire having as the inner liner a puncture sealing laminate wherein an outer layer of the laminate comprises halobutyl polymer and an inner layer of the laminate comprises butyl polymer and halobutyl polymer.

In accordance with the invention, there is provided a tubeless pneumatic tire having puncture sealing characteristics which tire comprises an annular road-engaging tread, two annular beads, two sidewalls, each sidewall connecting a side of said tread to an annular bead, reinforcing body ply or plies extending from one bead to the other under the sidewall and tread portions, and an inner liner extending inside said reinforcing body ply or plies from one bead toe to the other bead toe, characterized in that said inner liner comprises a puncture sealing laminate comprising an outer layer and an inner layer, said inner layer being innermost of the laminate, wherein said outer layer comprises halobutyl polymer and said inner layer comprises a partially degraded sealant layer derived per 100 parts by weight of polymer from about 85 to about 95 parts by weight of a first polymer containing from about 97.5 to about 99 weight percent of isobutylene and from about 1 to about 2.5 weight percent of isoprene, and from about 5 to about 15 parts by weight of a second polymer containing from about 1.5 to about 2.5 weight percent of bromine, from about 95 to about 97.5 weight percent of isobutylene and from about 1 to about 2.5 weight percent of isoprene, and from about 2.5 to about 10 parts by weight of a zinc peroxide compound containing from about 45 to about 65 weight percent of zinc peroxide.

Still further in accordance with the invention, there is provided a tubeless pneumatic tire having puncture sealing characteristics which tire comprises an annular road-engaging tread, two annular beads, two sidewalls, each sidewall connecting a side of said tread to an annular bead, reinforcing body ply or plies extending from one bead to the other under the sidewall and tread portions, and an inner liner extending inside said reinforcing body ply or plies from one bead toe to the other bead toe, characterized in that said inner liner comprises a puncture sealing laminate having a first outer layer and a second outer layer overlapping an inner layer, said first and second outer layers being joined together at the area of overlap, said second outer layer being innermost of the laminate, wherein said first and second outer layers comprise halobutyl polymer and said inner layer comprises a partially degraded sealant layer derived per 100 parts by weight of polymer from about 85 to about 95 parts by weight of a first polymer containing from about 97.5 to about 99 weight percent of isobutylene and from about 1 to about 2.5 weight percent of isoprene, and from about 5 to about 15 parts by weight of a second polymer containing from about 1.5 to about 2.5 weight percent of bromine, from about 95 to about 97.5 weight percent of isobutylene and from about 1 to about 2.5 weight percent of isoprene, and from about 2.5 to about 10 parts by weight of a zinc peroxide compound containing from about 45 to about 65 weight percent of zinc peroxide.

Further in accordance with the invention, there is provided a process for producing a tubeless pneumatic tire having puncture sealing characteristics which process comprises the steps of assembling a tire having a road-engaging tread, two annular beads, two sidewalls, reinforcing body ply or plies and an inner liner, and shaping and vulcanizing said tire, characterized in that said inner liner is a puncture sealing laminate produced by providing an outer layer and an inner layer, said outer layer comprising halobutyl polymer, and said inner layer comprising polymeric material degradable on vulcanization to a partially degraded sealant layer and derived per 100 parts by weight of polymer from about 85 to about 95 parts by weight of a first polymer containing from about 97.5 to about 99 weight percent of isobutylene and from about 1 to about 2.5 weight percent of isoprene, and from about 5 to about 15 parts by weight of a second polymer containing from about 1.5 to about 2.5 weight percent of bromine, from about 95 to about 97.5 weight percent of isobutylene and from about 1 to about 2.5 weight percent of isoprene, and from about 2.5 to about 10 parts by weight of a zinc peroxide compound containing from about 45 to about 65 weight percent of zinc peroxide.

Further still in accordance with the invention, there is provided a process for producing a tubeless pneumatic tire having puncture sealing characteristics which process comprises the steps of assembling a tire having a road-engaging tread, two annular beads, two sidewalls, reinforcing body ply or plies and an inner liner, and shaping and vulcanizing said tire, characterized in that said inner liner is a puncture sealing laminate produced by providing a first outer layer, an inner layer and a second outer layer wherein said first and second outer layers overlap said inner layer and are joined together at the area of overlap, said first and second outer layers comprising halobutyl polymer and said inner layer comprising polymeric material degradable on vulcanization to a partially degraded sealant layer and derived per 100 parts by weight of polymer from about 85 to about 95 parts by weight of a first polymer containing from about 97.5 to about 99 weight percent of isobutylene and from about 1 to about 2.5 weight percent of isoprene, and from about 5 to about 15 parts by weight of a second polymer containing from about 1.5 to about 2.5 weight percent of bromine, from about 95 to about 97.5 weight percent of isobutylene and from about 1 to about 2.5 weight percent of isoprene, and from about 2.5 to about 10 parts by weight of a zinc peroxide compound containing from about 45 to about 65 weight percent of zinc peroxide.

DETAILED DESCRIPTION OF THE INVENTION

The invention will be more readily understood by reference to the drawings wherein.

Figure 1:
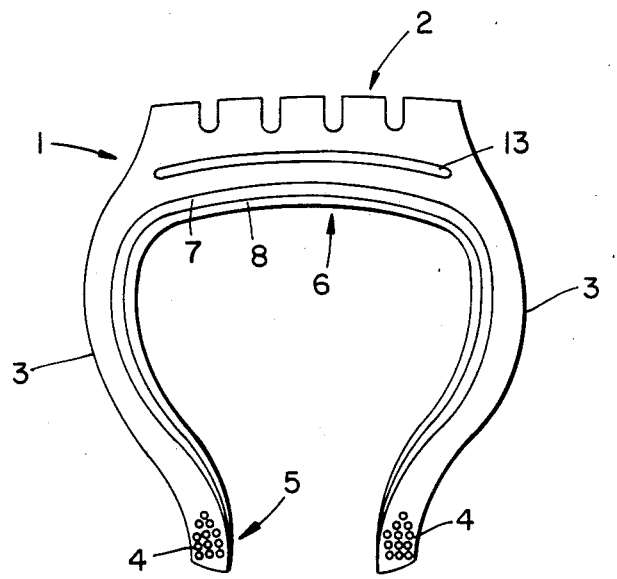
FIG. 1 is a cross-sectional view of a tire having a puncture sealing inner liner according to the invention.

The essence of this invention lies in providing an inner liner for a tire wherein the inner liner is a puncture sealing laminate, the inner layer of which comprises a polymer degraded by reaction with a zinc peroxide compound such that both when the inner liner is penetrated by a puncturing means and when the puncturing means is removed sealing of the inner liner will occur at the point of puncture, such sealing being by the degraded polymer of the inner layer of the laminate. The inner liner composition is such as to provide good heat ageing characteristics to allow retreading of the tires.

Accordingly, it is necessary to provide an inner liner of not too great thickness as to be impractical but thick enough to allow its manufacture. It is also necessary to provide in the laminate forming the inner liner sufficient green strength for it to be self-supporting, especially during the stages of tire assembly and forming. It is also necessary to provide an inner layer of the laminate that will flow into and seal holes that would otherwise be formed on penetration by or removal of a puncturing means but yet not flow too much at the operating temperature of the tire to flow out of or through the puncture hole. By the use as inner liner of a puncture sealing laminate, there is eliminated any problem prevalent in the prior art when the puncturing means enters the sidewall portion of the tire because the inner liner of the present invention is present from bead toe to bead toe whereas in much of the prior art the interior coatings providing the sealing characteristics were only present at the tread area or the immediately adjacent shoulder and sidewall area of the tire.

The inner layer of the laminate forming the inner liner is a partially degraded sealant layer derived from a first polymer which is a butyl polymer, a second polymer which is a bromobutyl polymer, and a zinc peroxide compound. Butyl polymer is well known in the art and is a polymer of isobutylene and isoprene. A preferred butyl polymer contains from about 97.5 to about 99, most preferably from about 98 to about 99, weight percent of isobutylene and from about 1 to about 2.5, most preferably from about 1 to about 2, weight percent of isoprene. The butyl polymer is a solid polymer having a molecular weight, expressed as the Mooney viscosity (ML 1+8 at 100° C.), of from about 60 to about 80. Bromobutyl polymer is described hereinafter.

The zinc peroxide compound used in the inner layer is a commercially available material containing from about 45 to about 65 weight percent of zinc peroxide and has the appropriate half-life at the temperatures used for vulcanization of tires. The amount of such zinc organic peroxide compound is from about 2.5 to about 10 parts by weight per 100 parts by weight of polymer.

The outer layer and, when used, the second outer layer of the laminate comprise halobutyl polymer. Halobutyl polymer is well known in the art and is one of chlorobutyl or bromobutyl polymer and is produced by the chlorination or bromination of butyl polymer. Chlorobutyl polymer contains from about 96 to about 98.25 weight percent of isobutylene, from about 1 to about 2.5 weight percent of isoprene and from about 0.75 to about 1.5 weight percent of chlorine. Bromobutyl polymer contains from about 95 to about 97.5 weight percent of isobutylene, from about 1 to about 2.5 weight percent of isoprene and from about 1.5 to about 2.5 weight percent of bromine. The chlorobutyl and bromobutyl polymers are solid polymers having a molecular weight, expressed as the Mooney viscosity (ML 1+8 at 125° C.), of from about 25 to about 60.

The layers of the laminate forming the inner liner are compounded with ingredients well known in the art. The inner layer preferably contains, per 100 parts by weight of polymer, from about 2.5 to about 10 parts by weight of zinc peroxide compound, from about 40 to about 100 parts by weight of one or more types of carbon black, from about 5 to about 30 parts by weight of one or more hydrocarbon oils especially paraffinic hydrocarbon oil, from about 2 to about 20 parts by weight of one or more tackifiers such as hydrocarbon or hydrogenated wood rosin tackifiers and from about 0.5 to about 3 parts by weight of other processing aids such as stearic acid and the like. There may also be present in the compound small amounts of a thixotropic material capable of providing structure to the compound. Such thixotropic material may be selected from the colloidal aluminum silicates and the fine particle size precipitated silicas and may be present in amounts up to about 20 parts by weight per 100 parts by weight of polymer. Preferably, the compounded polymer will have a compound Mooney viscosity (ML 1+4 at 100° C.) of from about 20 to about 80, for ease of mixing, calendering or extrusion into sheets for use in the laminate. The compounding procedure is well known in the art and may utilize mill mixing or internal mixing under conditions well known for compounding of butyl polymer compounds.

The outer layer, and the first and second outer layers when used and which are preferably but not necessarily essentially identical in composition, preferably contains, per 100 parts by weight of halobutyl polymer, from about 20 to about 80 parts by weight of one or more types of carbon black or from about 15 to about 40 parts by weight of carbon black and from about 30 to about 90 parts by weight of calcium carbonate or soft clay, from about 5 to about 30 parts by weight of one or more hydrocarbon oils especially paraffinic hydrocarbon oil, from about 2 to about 15 parts by weight of one or more tackifiers such as hydrocarbon or hydrogenated wood rosin tackifiers, from about 0.5 to about 3 parts by weight of other processing aids such as stearic acid and a vulcanization system. Suitable vulcanization systems include, per 100 parts by weight of halobutyl polymer, from about 2 to about 15 parts by weight of zinc oxide, from about 0.5 to about 2 parts by weight of one or more sulphur-containing accelerators such as, but not limited to, benzothiazyl disulphide, mercaptoimidazoline, tetraethylthiuram disulphide and from 0 to about 1 part by weight of sulphur. A preferred vulcanization system includes from about 2 to about 5 parts by weight of zinc oxide, from about 1 to about 1.5 parts by weight of a sulphur-containing accelerator and from 0 to about 0.5 parts by weight of sulphur. The compounding procedure is well known in the art and may utilize mill mixing or internal mixing, with the components of the vulcanization system being added in a separate step and at a lower temperature, such as from about 40° to about 70° C. Preferably, the compounded halobutyl polymer will have a compound Mooney viscosity (ML 1+4 at 100° C.) of from about 30 to about 80.

The compounded polymer for the inner layer and the compounded halobutyl polymer for the outer layer are separately formed into sheets or plies, such as by calendering. A laminate inner liner may be prepared by plying together an outer sheet of compounded halobutyl polymer and an inner sheet of compounded polymer. If a second outer layer is to be used a second outer sheet of compounded halobutyl polymer may be added. Alternatively, the sheets of compounded polymers may be handled separately, the laminate being created at the final shaping step before vulcanization. In order to keep the weight of the laminate forming the inner liner within a reasonable and practical range, we prefer to use sheets or plies of compounded halobutyl polymer having a thickness of from about 0.3 to about 1.5 mm, preferably from about 0.4 to about 1 mm, and to use sheets or plies of compounded polymer having a thickness of from about 0.7 to about 4 mm, preferably from about 1 to about 3 mm. When a first and a second outer layer are used, the thickness of the sheets or plies of compounded halobutyl polymer may be the same or may be different - for example, the ply which will be innermost of the tire may be thinner than the other ply. In general, inner liners for use in passenger tires will be thinner than inner liners for use in trucks, other commercial vehicles or off-the-road tires. Procedures for forming such sheets or plies and for plying together such sheets are well known in the industry.

The tire is assembled by procedures well known in the industry. For example, on a tire building drum a laminate inner liner is laid down or the individual layers to form the laminate inner liner are laid down, the reinforcing ply or plies are located on the drum, the beads are applied followed by the tread portion and the sidewalls. The assembled tire is placed in a mold wherein it is finally shaped and heated to vulcanize the whole assembly. Such vulcanization conditions may range from times up to about 28 hours at a temperature of about 125° C. for giant tires e.g. for earthmovers to times of as low as 4 minutes at temperatures of about 170° to about 180° C. for passenger and other small tires. Generally, for passenger car tires, such vulcanization conditions may be for times of from about 5 to about 15 minutes at temperatures of from about 160° to about 180° C. Such tires may be of any of the known types, that is radial, bias or bias belted.

During the vulcanization, the normal curing of the rubber components occurs. The halobutyl outer layer or layers of the laminate inner liner undergo the normal curing and the inner layer undergoes partial degradation due to reaction of the butyl polymer with the zinc peroxide compound and partial curing of the bromobutyl polymer thereby forming a polymeric material which will provide the puncture sealing characteristics.

We have found that during vulcanization, certain conditions can lead to the generation of volatile components within the inner layer of the laminate. When organic peroxides are used as the degradation agent for the inner layer, the degradation that occurs during vulcanization is very rapid and results in the formation of a very flowable material and results in the generation of undesirably high levels of volatile components, such volatile components being from 1 to 2, or more, weight percent of the weight of the inner layer. In contrast, when a zinc peroxide compound is used as the degradation agent for the inner layer, the degradation that occurs during vulcanization is slower and more controllable and results in the formation of a less flowable material which will effectively seal puncture holes but yet not flow through such seal holes at tire operating temperatures and results in the generation of significantly lower levels of volatile components of from about 0.5 to less than 1 weight percent of the weight of the inner layer. The presence of volatile components in the inner layer of the inner liner is undesirable because it can lead to blistering, ballooning, physical weakness and lack of integrity. Accordingly, the improvement achieved by the use of a zinc peroxide compound rather than organic peroxides is a significant advance in the state of the art.

Further, we have also found that the addition of calcium oxide to the composition of the inner layer results in a further reduction in the formation of volatile components during the vulcanization step. This further reduction in the formation of volatile components to less than about 0.5 weight percent of the inner layer only occurs when zinc peroxide compounds are used as the degradation agent and does not occur when organic peroxides are used. The amount of calcium oxide added to the composition of the inner layer is from about 1 to about 3 parts by weight per 100 parts by weight of polymer in the inner layer. Accordingly, a most preferred composition of the inner layer contains, per 100 parts by weight of polymer as hereinbefore defined, from about 2.5 to about 10 parts by weight of zinc peroxide compound, from 1 to about 3 parts by weight of calcium oxide, from about 40 to about 100 parts by weight of one or more types of carbon black, from about 5 to about 30 parts by weight of one or more hydrocarbon oils especially paraffinic hydrocarbon oil, from about 2 to about 20 parts by weight of one or more tackifiers such as hydrocarbon or hydrogenated wood rosin tackifiers, and from about 0.5 to about 3 parts by weight of other processing aids such as stearic acid and the like.

Figure 2:
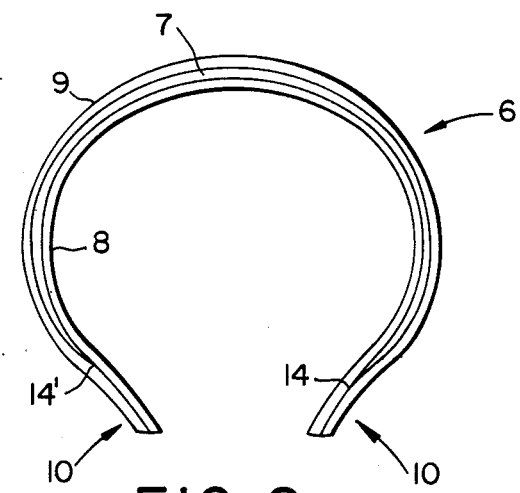
FIG. 2 is a cross-sectional view of a puncture sealing inner liner of the invention.
Figure 3:
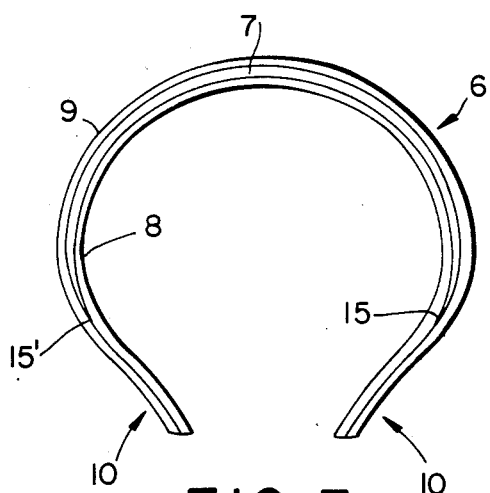
FIG. 3 is a cross-sectional view of an alternative embodiment of a puncture sealing inner liner of the invention.
Figure 4:
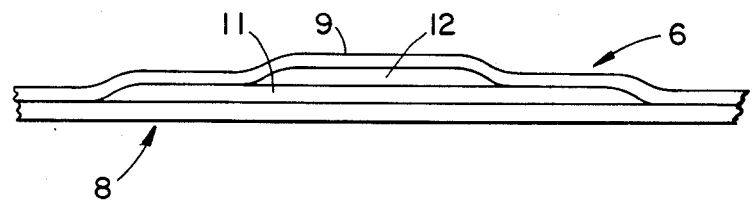
FIG. 4 is a cross-sectional view of a further embodiment of a puncture sealing inner liner for use in a pneumatic tire.

Referring now to the Figures, FIG. 1 shows a cross-sectional view of a tire having a puncture sealing inner liner wherein the tire is generally shown at 1, the tread portion at 2, a reinforcing belt is shown at 13 (as would be used in a bias belted or radial tire), a sidewall at 3, an annular bead at 4 and the inner liner generally by 6, a reinforcing body ply (not shown) extending from one bead to the other. The inner liner 6 is made up of an outer layer 8 and an inner layer 7 and extends from one annular bead 4 to the other, preferably ending in the region of the bead toe at 5. FIGS. 2 and 3 show two embodiments of an inner liner 6, having a first outer layer 9, an inner layer 7 and a second outer layer 8, the inner liner terminating at 10 which would coincide approximately with the region of the bead toe. The inner layer of these embodiments, which is the sealing layer, may extend through the laminate from point 14' to the point 14 (as in FIG. 2) which essentially coincides with a point closely adjacent to the bead toe of the tire or may extend through the laminate from point 15' to the point 15 (as in FIG. 3) which essentially coincides with a wide, or even the widest, portion of the tire. In FIG. 4, in another embodiment the outer first layer is shown at 9 and the outer second layer is shown at 8 of the inner liner 6 before it is transformed to the toroidal shape. The inner layer is shown as having two portions, a first portion being at 11 and a second portion being at 12. As is well known in the art, transforming the flat inner liner to the toroidal shape causes some thinning down of the thickness particularly at the central portion - hence, the planar form of the inner liner shown in FIG. 4 with the inclusion of the second portion 12 of the inner layer facilitates provision of an inner liner within the tire having an essentially even thickness of the inner layer. Similarly, a construction may be used which omits the second outer layer 9 of FIG. 4.

The following examples illustrate the present invention and do not limit the scope thereof. All parts are parts by weight unless otherwise specified.

EXAMPLE 1

Laboratory equipment was set up to screen potential inner liner materials. An automobile tire was connected at the valve, by small diameter tubing to a source of air, a pressure gauge and to a test sample cell. The volume of air in the tire was large compared to the volume of air in the remaining items of the laboratory equipment and accordingly any leakage of the test inner liner located in the test sample cell would reflect what would happen to the air pressure in a tire.

Inner liner samples were prepared for test as follows. A bromobutyl polymer compound was prepared according to the recipe shown in Table I, in which the bromobutyl polymer contained about 2 weight percent of bromine, about 2.2 weight percent isoprene and the balance isobutylene and had a Mooney viscosity (ML 1+8 at 125° C.) of about 30. This compound was prepared by mixing in an internal mixer with the starting temperature at 70° C. and final dump temperature of about 125° C., the curative system being added on a mill at 50° C. Four sealant layer compounds were prepared according to the recipes shown in Table II, in which the butyl polymer contained about 1.6 mole percent of isoprene and the balance isobutylene and the bromobutyl polymer is the same as that described above. These compounds were prepared by mixing in an internal mixer with a starting temperature of 40° to 50° C. and completion of the mixing in about 4 minutes, with the peroxide for Samples 2 and 3 and the bromobutyl polymer, zinc peroxide compound and calcium oxide for Samples 4 and 5 being added on a cool (about room temperature) mill.

TABLE I

| Sample # | 1 |
|---|---|
| Bromobutyl polymer | 100 |
| Carbon Black N-660 type | 60 |
| Stearic Acid | 1 |
| Tackifier (pentaerythritol ester of rosin) | 4 |
| Extender oil (paraffinic) | 15 |
| Curative System | |
| Zinc oxide | 3 |
| 2,2'-Dibenzothiazyl disulphide | 1.3 |
| Sulphur | 0.1 |
| Compound Viscosity (ML 1 + 4 at 100° C.) | 45 |

TABLE II

| Sample # | 2 | 3 | 4 | 5 |
|---|---|---|---|---|
| Butyl polymer | 100 | 100 | 90 | 90 |
| Bromobutyl polymer | — | — | 10 | 10 |
| Carbon black N-660 type | 60 | 60 | 60 | 60 |
| Extender oil (paraffinic) | 10 | 10 | 15 | 15 |
| Stearic acid | — | — | 2 | 2 |
| Tackifier (Wingtack ® 95) | 15 | 15 | 15 | 15 |
| α,α'-bis(t-butyl peroxy) di-isopropyl benzene (40% on clay) | 7.5 | 7.5 | — | — |
| Zinc peroxide compound (55% zinc peroxide) | — | — | 7.5 | 7.5 |
| Calcium oxide | — | — | 2 | 2 |
| Compound Viscosity (ML 1 + 4 at 100° C.) | 44.5 | 38 | 46 | 48.5 |

The compounds were calendered into sheets, using a three roll calender with the rolls at temperatures of 100° to 115° C., of about 1 mm thickness.

Inner liner samples were prepared by plying one sheet of each compound onto a sheet of the other compound to form a laminate. The laminate inner liners were heated for 15 minutes at 180° C. The vulcanized laminates were then tested in the laboratory equipment. The test procedure involved placing a sample of the vulcanized laminate in the test sample cell, pressuring the system to 30 psi (2 kg/cm$^2$) with air, checking for leaks and re-assembling if necessary until leak-free, puncturing the laminate with a nail having a diameter of 4.8 mm, leaving the nail in for 1 minute, withdrawing the nail and monitoring the change in pressure every minute for 5 minutes and finally after a test time of 10 minutes. The procedure was repeated by puncturing with the nail through the same puncture and monitoring the pressure change and then repeated again. A laminate was judged to be a failure if the pressure in the cell dropped 15% or more at the end of the first minute and continued to drop over the total test time of 10 minutes or if the pressure in the cell dropped 15% or more over the total test time of 10 minutes for any of the three repeat tests. The results of the puncture testing are shown in Table III.

TABLE III

Puncture testing of laminates after vulcanization.

| Laminate | Puncture Test Result | Adhesion to Carcase | Blister Formation |
|---|---|---|---|
| #1/#2 | Pass | No | Yes |
| #1/#3 | Pass | No | Yes |
| #1/#4 | Pass | Yes | No |
| #1/#5 | Pass | Yes | No |

Further samples of the laminates were placed on a standard carcase stock in a special bladder mold. The standard carcase stock contained, by weight, 100 parts of natural rubber (SMR-5CV), 30 parts of carbon black (N-550), 5 parts of oil (Circosol 4240), 5 parts of zinc oxide, 1.5 parts of stearic acid, 0.5 parts of N-tert-butyl-2-benzothiazole sulphenamide and 2.4 parts of sulphur. The bladder mold was a square metal frame having a floating central plate occupying about one third of the surface area of the metal frame and connected on one side to a supply of gas. The mold was placed between the platens of a standard curing press, a sheet of laminate inner liner placed on top of the floating central plate and a sheet of standard carcase stock placed on top of the inner liner sheet. The platens of the curing press were pre-heated to 180° C. The curing press was closed, air at 100 psi applied to the bottom of the floating plate, a warm up time of 3 minutes was allowed and the assembly maintained at 180° C. for a further 15 minutes after warm up for vulcanization. The gas pressure was reduced to atmospheric and the platens opened. The vulcanizate was removed from the mold and examined to determine whether the laminate inner liner had adhered or not to the carcase and to determine whether the bromobutyl layer of the inner liner showed the presence of blisters indicating the presence of gaseous components in the partially degraded layer. These results are given in Table III, from which it is clear that inner layers made by organic peroxide degradation do not adhere to the carcase and exhibit blisters whereas those made by zinc peroxide degradation do adhere to the carcase and do not exhibit blisters.

EXAMPLE 2

Compounds of the same composition as Samples #3 and 4 of Table II and a further two compounds of the same composition except that α,α'-bis(t-butylperoxy) di-isopropylbenzene was used instead of the zinc peroxide compound (Samples #3A and 4A), in sheet form, were separately weighed, put into an air circulating oven at 204° C. for 15 minutes, removed, reweighed and examined. Samples #3 and 4 showed no blisters and both lost 0.5% of their original weight. Samples #3A and 4A showed blisters and lost 2.8% and 3.6% of their original weight.

EXAMPLE 3

Compounds for use in the sealant layer were prepared according to the recipes, following the procedure of Example 1, shown in Table IV and evaluated. The Mooney viscosity was measured on the compounds and was measured on the partially degraded material after heating for 15 minutes at 180° C. - the results are shown in the Table. Further portions of the compounds were put into an air circulating oven for 20 minutes at 204° C. and the weight loss determined as described in Example 2, with the results shown in the Table.

TABLE IV

| Sample # | 6 | 7 | 8 |
|---|---|---|---|
| Butyl polymer | | 90 | |
| Bromobutyl polymer | | 10 | |
| Carbon black (N-660) | | 60 | |
| Extender oil (paraffinic) | | 15 | |
| Stearic acid | | 2 | |
| Tackifier (Wingtack 95) | | 15 | |
| Calcium oxide | | 2 | |
| Zinc peroxide compound (55% zinc peroxide) | 5 | 7.5 | 10 |
| Compound Mooney (ML 1 + 4 at 100° C.) | 43 | 43.5 | 43.5 |
| Mooney after heating (ML 1 + 4 at 100° C.) | 34.5 | 30 | 26 |
| Weight loss - wt. % | <0.5 | <0.5 | <0.5 |

EXAMPLE 4

Compounds similar to Samples 4 and 5 of Example 1 except that they contained no calcium oxide were prepared and evaluated as in Example 1. These compounds were found to pass the puncture test, to adhere to the carcase and to show minimal evidence of blister formation. Weight loss on testing as in Example 2 was between 0.5 and 1 weight %.

EXAMPLE 5

Laminate inner liners similar to those of Example 1 except that they had a first and a second outer layer (identical compositions) and an inner layer (same composition as Sample #4) were prepared and evaluated and found to behave essentially the same as the laminates containing Sample #4 of Example 1.

What is claimed is:

1. A tubeless pneumatic tire having puncture sealing characteristics which tire comprises an annular road-engaging tread, two annular beads, two sidewalls, each sidewall connecting a side of said tread to an annular bead, reinforcing body ply or plies extending from one bead to the other under the sidewall and tread portions, and an inner liner extending inside said reinforcing body ply or plies from one bead toe to the other bead toe, characterized in that said inner liner comprises a puncture sealing laminate comprising an outer layer and an inner layer, said inner layer being innermost of the laminate, wherein said outer layer comprises halobutyl polymer and said inner layer comprises a partially degraded sealant layer derived per 100 parts by weight of polymer from about 85 to about 95 parts by weight of a first polymer containing from about 97.5 to about 99 weight percent of isobutylene and from about 1 to about 2.5 weight percent of isoprene, and from about 5 to about 15 parts by weight of a second polymer containing from about 1.5 to about 2.5 weight percent of bromine, from about 95 to about 97.5 weight percent of isobutylene and from about 1 to about 2.5 weight percent of isoprene, and from about 2.5 to about 10 parts by weight of a zinc peroxide compound containing from about 45 to about 65 weight percent of zinc peroxide.

2. The tire of claim 1 wherein said inner layer of said inner liner also contains from about 1 to about 3 parts by weight of calcium oxide.

3. The tire of claim 1 wherein said inner liner comprises a puncture sealing laminate having a first outer layer and a second outer layer overlapping an inner layer, said first and second outer layers being joined together at the area of overlap, said second outer layer being innermost of the laminate.

4. The tire of claim 3 wherein said inner layer of said inner liner also contains from about 1 to about 3 parts by weight of calcium oxide.

5. The tire of claim 1 wherein the inner layer of said inner liner contains, per 100 parts by weight of polymer, from about 2.5 to about 10 parts by weight of said zinc peroxide compound, from about 40 to about 100 parts by weight of one or more types of carbon black, from about 5 to about 30 parts by weight of one or more hydrocarbon oils, from about 2 to about 20 parts by weight of one or more tackifiers and from about 0.5 to about 3 parts by weight of other processing aids, and said first polymer has a Mooney viscosity (ML 1+8 at 100° C.) of from about 60 to about 80 and said second polymer has a Mooney viscosity (ML 1+8 at 125° C.) of from about 25 to about 60.

6. The tire of claim 1 wherein the halobutyl polymer is selected from chlorobutyl and bromobutyl, said chlorobutyl containing from about 96 to about 98.25 weight percent of isobutylene, from about 1 to about 2.5 weight percent of isoprene and from about 0.75 to about 1.5 weight percent of chlorine, and said bromobutyl containing from about 95 to about 97.5 weight percent of isobutylene, from about 1 to about 2.5 weight percent of isoprene and from about 1.5 to about 2.5 weight percent of bromine, said halobutyl having a Mooney viscosity (ML 1+8 at 125° C.) of from about 25 to about 60.

7. The tire of claim 6 wherein said outer layer contains, per 100 parts by weight of halobutyl polymer, from about 20 to about 80 parts by weight of one or more carbon black or from about 15 to about 40 parts by weight of carbon black and from about 30 to about 90 parts by weight of calcium carbonate or soft clay, from about 5 to about 30 parts by weight of one or more hydrocarbon oil, from about 2 to about 15 parts by weight of one or more tackifier, from about 0.5 to about 3 parts by weight of other processing aids and a vulcanization system.

8. The tire of claim 7 wherein the vulcanization system is from about 2 to about 5 parts by weight of zinc oxide, from about 1 to about 1.5 parts by weight of sulphur-containing accelerator and from 0 to about 0.5 parts by weight of sulphur.

* * * * *